(12) United States Patent
Hillan et al.

(10) Patent No.: US 9,094,049 B2
(45) Date of Patent: Jul. 28, 2015

(54) METHODS AND APPARATUS FOR IMPROVING DEVICE ACTIVITION AMONG A PLURALITY OF NFC DEVICES THAT SUPPORT TYPE A RF TECHNOLOGY

(71) Applicant: QUALCOMM Incorporated, San Diego, CA (US)

(72) Inventors: John Hillan, Farnborough (GB); Dubai Chingalande, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 263 days.

(21) Appl. No.: 13/668,836

(22) Filed: Nov. 5, 2012

(65) Prior Publication Data

US 2013/0267169 A1     Oct. 10, 2013

Related U.S. Application Data

(60) Provisional application No. 61/622,307, filed on Apr. 10, 2012.

(51) Int. Cl.
| | |
|---|---|
| H04B 5/02 | (2006.01) |
| H04B 5/00 | (2006.01) |
| H04W 76/04 | (2009.01) |
| H04W 84/18 | (2009.01) |

(52) U.S. Cl.
CPC ............... *H04B 5/00* (2013.01); *H04B 5/0031* (2013.01); *H04B 5/02* (2013.01); *H04W 76/046* (2013.01); *H04W 84/18* (2013.01)

(58) Field of Classification Search
CPC .......... H04B 5/02; H04B 5/0031; H04B 5/00; H04B 5/0025; H04B 5/0037; H04B 5/0056
USPC ........ 455/41.1, 41.2, 63.1, 114.2, 278.1, 296; 343/866
See application file for complete search history.

(56) References Cited

U.S. PATENT DOCUMENTS

| | | | |
|---|---|---|---|
| 7,930,249 B2 * | 4/2011 | Roberts ........................... | 705/41 |
| 7,941,176 B2 * | 5/2011 | Breitfuss et al. ........... | 455/550.1 |
| 8,516,255 B2 * | 8/2013 | Roberts et al. ................ | 713/171 |

(Continued)

FOREIGN PATENT DOCUMENTS

| | | |
|---|---|---|
| EP | 2365676 A1 | 9/2011 |
| WO | WO2012058724 A1 | 5/2012 |

OTHER PUBLICATIONS

Hillan J "Correction to NFC-A Collision Resolution Activity", Feb. 3, 2012, XP055059795, Retrieved from the Internet: URL: http://www.nfc-forum.org/apps/group_public/download.php/11097/Qualcomm%20Input%20Paper%20on%20NFC-A%20Collision%20Resolution.docx [retrieved on Apr. 16, 2013].
Hillan J., "Symmetrical NFC-A Device Activation", www.nfc-forum.org Apr. 12, 2012, XP002716185, Retrieved from the Internet: URL: http://www.nfc-forum.org/apps/group_public/download.php/11659/

(Continued)

*Primary Examiner* — Minh D Dao
(74) *Attorney, Agent, or Firm* — Charles E. Eggers

(57) ABSTRACT

Aspects disclosed herein relate to improving device activation among a plurality of NFC type-A RF technology listening devices. In one example, a communications device is equipped to determine that a remote NFC device of a plurality of resolved remote NFC devices, other than a last remote NFC device of the plurality of resolved remote NFC devices, is a target NFC device for a device activation process, and transmit a first sleep request to the last remote NFC device of the plurality of resolved remote NFC devices.

32 Claims, 7 Drawing Sheets

(56) References Cited

U.S. PATENT DOCUMENTS

| | | | | |
|---|---|---|---|---|
| 8,559,875 | B2* | 10/2013 | Takayama | 455/41.2 |
| 8,605,903 | B2* | 12/2013 | Morita et al. | 380/270 |
| 8,626,066 | B2* | 1/2014 | Geslin et al. | 455/41.2 |
| 8,666,891 | B2* | 3/2014 | Roberts | 705/41 |
| 8,676,277 | B2* | 3/2014 | Takayama | 455/574 |
| 2006/0266822 | A1* | 11/2006 | Kelley et al. | 235/380 |
| 2007/0176748 | A1 | 8/2007 | Salamitou | |
| 2010/0277285 | A1 | 11/2010 | Anderson et al. | |
| 2011/0059694 | A1 | 3/2011 | Audic | |
| 2014/0136402 | A1* | 5/2014 | Roberts | 705/39 |
| 2014/0152526 | A1* | 6/2014 | Greig et al. | 343/866 |

OTHER PUBLICATIONS

Qualcomm%20Input%20Paper%20on%20Symmetrical%20NFC-A%20Device%20Activation.docx [retrieved on Nov. 12, 2013] the whole document.

International Search Report and Written Opinion—PCT/US2013/035674—ISA/EPO—Jan. 2, 2014.

NFC Activity Specification 1.0, Nov. 18, 2010, XP055059248, Retrieved from the Internet: URL: http://www.nfc-forum.org/specs/spec_license/document_form/custom_layout?13654233 May 21, 2001 [retrieved on Apr. 11, 2013] cited in the application, p. 62-p. 66.

* cited by examiner

US 9,094,049 B2

METHODS AND APPARATUS FOR IMPROVING DEVICE ACTIVATION AMONG A PLURALITY OF NFC DEVICES THAT SUPPORT TYPE A RF TECHNOLOGY

CLAIM OF PRIORITY UNDER 35 U.S.C. §119

The present application for patent claims priority to Provisional Application No. 61/622,307 entitled "METHODS AND APPARATUS FOR IMPROVING DEVICE ACTIVATION AMONG A PLURALITY OF NFC DEVICES THAT SUPPORT TYPE A RF TECHNOLOGY" filed Apr. 10, 2012, and assigned to the assignee hereof and hereby expressly incorporated by reference herein.

BACKGROUND

The disclosed aspects relate generally to communications between and/or within devices and specifically to methods and systems for improving device activation among a plurality of near field communication (NFC) type-A radio frequency (RF) technology listening devices.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are being manufactured with relatively large increases in computing capabilities, and as such, are becoming tantamount to small personal computers and hand-held PDAs. Further, such devices are being manufactured to enable communications using a variety of frequencies and applicable coverage areas, such as cellular communications, wireless local area network (WLAN) communications, NFC, etc.

NFC enabled devices may operation in a polling mode and/or a listening mode. The NFC Forum Activity specification defines a number of processes including one for Device Activation of a Remote NFC-A Device identified as part of earlier processes (e.g. Collision Resolution). As written in version 1.0 of the specification, Collision Resolution results in a possible situation in which one of the decided remote NFC devices may not be subsequently activated unless the polling NFC device restarting the entire technology discovery process. There are situations in which a polling device may attempt to communicate with each detected remote NFC device in turn. In these situations, each remote NFC device needs to be activated, data may then be exchanged with the activated remote NFC device, and then the activated remote NFDC device may be deactivated. Currently, when a polling NFC device first activates anything but the last device resolved, this last device becomes unavailable for later activation. This unavailability results from the Specification requirement that when a remote NFC device that is in an active sub-state receives an ALL_REQ message that remote NFC device is required to switch to an IDLE sub-state. The only way the polling NFC device may subsequently interact with the now idle remote NFC device is to perform all the steps of technology detection, and collision resolution.

Thus, improved apparatus and methods for providing a mechanism to improve device activation among a plurality of NFC type-A RF technology listening devices may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

In accordance with one or more aspects and corresponding disclosure thereof, various aspects are described in connection with improving device activation among a plurality of NFC type-A RF technology listening devices. In one example, a communications device is equipped to determine that a remote NFC device of a plurality of resolved remote NFC devices, other than a last remote NFC device of the plurality of resolved remote NFC devices, is a target NFC device for a device activation process, and transmit a first sleep request to the last remote NFC device of the plurality of resolved remote NFC devices.

According to related aspects, a method for improving device activation among a plurality of NFC type-A RF technology listening devices is provided. The method can include determining, by a polling NFC device, that a remote NFC device of a plurality of resolved remote NFC devices, other than a last remote NFC device of the plurality of resolved remote NFC devices, is a target NFC device for a device activation process. Moreover, the method may include transmitting a first sleep request to the last remote NFC device of the plurality of resolved remote NFC devices.

Another aspect relates to a communications apparatus enabled to improve device activation among a plurality of NFC type-A RF technology listening devices. The communications apparatus can include means for determining, by a polling NFC device, that a remote NFC device of a plurality of resolved remote NFC devices, other than a last remote NFC device of the plurality of resolved remote NFC devices, is a target NFC device for a device activation process. Moreover, the communications apparatus can include means for transmitting a first sleep request to the last remote NFC device of the plurality of resolved remote NFC devices.

Another aspect relates to a communications apparatus. The apparatus can include a transceiver, a memory, a processor coupled to the memory, and a NFC communications module coupled to at least one of the memory or processor. The NFC communications module may be configured to determine that a remote NFC device of a plurality of resolved remote NFC devices, other than a last remote NFC device of the plurality of resolved remote NFC devices, is a target NFC device for a device activation process. Moreover, the transceiver may be configured to transmit a first sleep request to the last remote NFC device of the plurality of resolved remote NFC devices.

Still another aspect relates to a computer program product, which can have a computer-readable medium including code for determining, by a polling NFC device, that a remote NFC device of a plurality of resolved remote NFC devices, other than a last remote NFC device of the plurality of resolved remote NFC devices, is a target NFC device for a device activation process. Moreover, the computer-readable medium can include code for transmitting a first sleep request to the last remote NFC device of the plurality of resolved remote NFC devices.

To the accomplishment of the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It should be understood, however, that such aspect(s) may be practiced without these specific details.

Generally, a device may recognize a NFC target device and/or tag when within range of a coverage area of the NFC device. Where multiple NFC enabled devices are within the coverage area, various processes may be performed to identify each of these remote NFC devices. For example, technology detection, collision resolution, and device activation processes may be performed. As described herein, a polling NFC device may be configured to implement an improved device activation procedure where the last remote NFC device determined during collision resolution is not the remote NFC device with which the polling NFC device intends to communicate with first.

Figure 1:
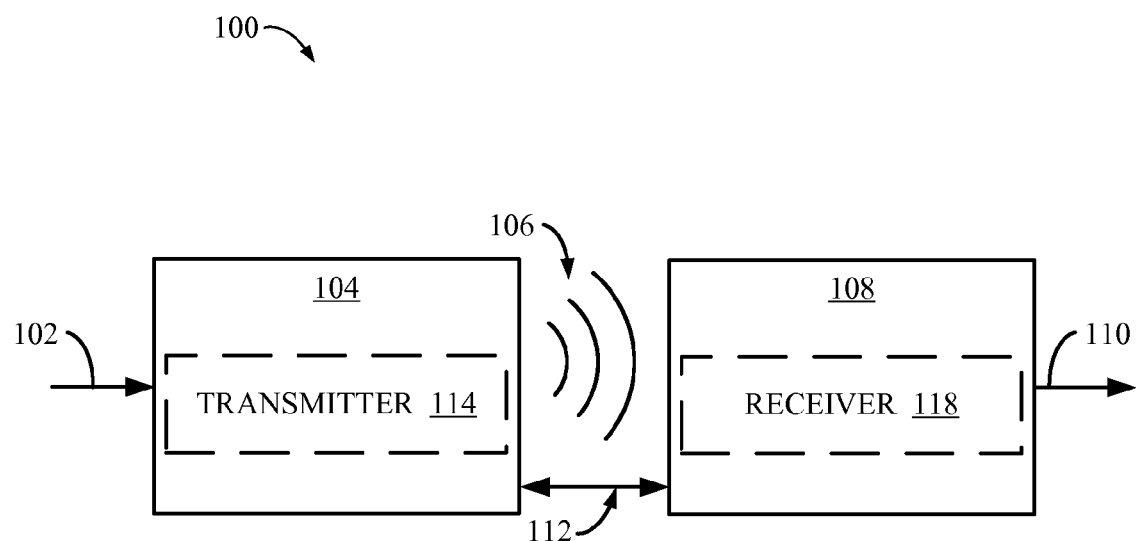
FIG. 1 is a block diagram of a wireless communication system, according to an aspect.

FIG. 1 illustrates a wireless communication system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In an exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission. A receiver 108 includes a receive antenna 118 as a means for energy reception. The transmit and receive antennas are sized according to applications and devices associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
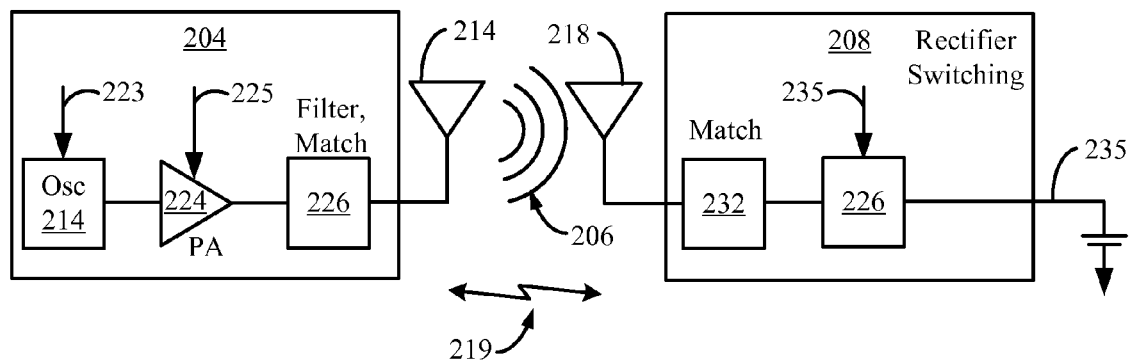
FIG. 2 is a schematic diagram of a wireless communication system, according to an aspect.

FIG. 2 is a schematic diagram of an example near field wireless communication system. The transmitter 204 includes an oscillator 222, a power amplifier 224 and a filter and matching circuit 226. The oscillator is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 204 to the transmit antenna 214.

The receiver 208 may include a matching circuit 232 and a rectifier and switching circuit 234 to generate a DC power output to charge a battery 236 as shown in FIG. 2 or power a device coupled to the receiver (not shown). The matching circuit 232 may be included to match the impedance of the receiver 208 to the receive antenna 218. The receiver 208 and transmitter 204 may communicate on a separate communication channel 219 (e.g., Bluetooth, Zigbee, cellular, etc).

Figure 3:
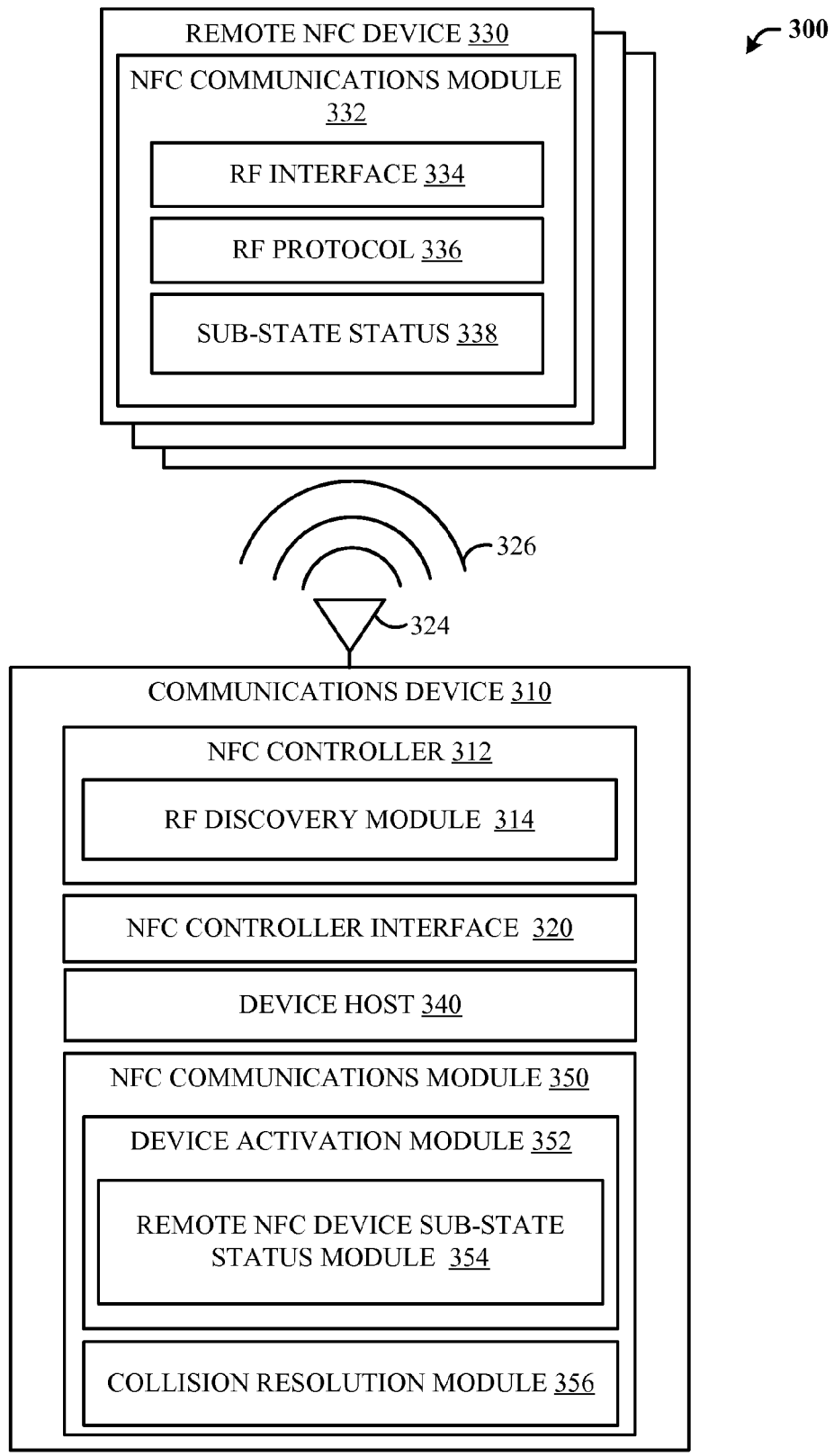
FIG. 3 is a block diagram of a NFC environment, according to an aspect.

With reference to FIG. 3, a block diagram of a communication network 300 according to an aspect is illustrated. Communication network 300 may include communications devices 310 which, through antenna 324, may be in communication with one or more remote NFC devices 330 using one or more NFC technologies 326 (e.g., NFC-A, NFC-B, NFC-F, etc.). In an aspect, each of the one or more remote NFC devices 330 and/or communications device 310 may be configured to communicate through NFC communications module 332 through one or more RF interfaces 334 using one or more RF protocols 336. Further, NFC communications module 332 may be operable in different sub-states (e.g., active, idle, sleep, etc.). Sub-state status 338 of each of the one or more remote NFC devices 330 may be determined based on one or more factors associated with various processes used during establishment of a communication link (e.g., a technology detection process, a collision resolution process, etc.). In an aspect, these various processes may be performed as part of establishment of communications based on the NFC-A RF technology.

Where a plurality of remote NFC devices 330 are within a coverage range, a collision resolution process may be performed to identify each of the plurality of remote NFC devices 330. As part of the collision resolution process, once each of the plurality of remote NFC devices 330 is identified, a sleep message is sent by communications device 310 to the identified remote NFC device that changes the sub-state status 338 from active (ACTIVE) to asleep (e.g., SLEEP). Further, the last of the plurality of remote NFC devices is identified may have a sub-state status 338 left as active.

Communications device 310 may include NCI 320. In an aspect, NCI 320 may be configured to enable communications between a NFC enabled antenna and NFC controller 312. NCI 320 may be configured to function in a listening mode and/or a polling mode.

Communications device 310 may include a NFC controller (NFCC) 312. In an aspect, NFCC 312 may include RF discovery module 314. RF discovery module 314 may be configured to perform RF discovery using a RF discovery loop as part of a discovery process to enable peer mode communications. The RF discovery loop may include a portion of time in which communications device 310 is configured to performing pooling to discover one or more remote NFC devices 330 that are operable using NFC-A RF technology. DH 340 may be configured to generate a command to prompt NFCC 312 to perform various functions associated with RF discovery.

Communications device 310 may include NFC communications module 350. NFC communications module 350 may be configured to enable various modes and/or configurations for NFC communications. In an aspect, NFC communications module 350 may include device activation module 352 that may be configured to configure data exchange between a selected remote NFC device 330 and the communications device 310. In another aspect, NFC communications module 350 may include collision resolution module 354 that may be configured to perform a collision resolution process to resolve one or more remote NFC devices 330 that are within range to be able to communicate with communications device 310. Device activation module 352 may include remote NFC device sub-state status module 354 that may be configured to be aware of the current sub-state status 338 of each of the remote NFC devices 330. In an aspect, upon the successful conclusion of the collision resolution process, remote NFC device sub-state status module 354 that may be aware that all of the remote NFC device, with the exception of the last remote NFC device that was resolved, are in a sleep sub-state status 338. Further, remote NFC device sub-state status module 354 that may be aware that the last remote NFC device that was resolved has an active sub-state status 338. Still further, wherein NFC communications module 350 determines that communications device 310 intends to communication with any of the plurality of remote NFC devices 330 besides the last resolved remote NFC device, device activation module 352 may prompt the communications device 310 to transmit a sleep request (SLP_REQ) to the last resolved remote NFC device. In another aspect, NFC communications module 350 may further determine whether the communications device 310 may intend to communicate with the last resolved remote NFC device 330 prior to prompting the communications device 310 to transmit the sleep request. In other words, where subsequent communications with the last resolved remote NFC device 330 are not expected, no additional signaling may be performed.

Therefore, a system and method is disclosed for a communications device 310 to improve device activation among a plurality of NFC type-A RF technology listening devices 330.

Figure 4:
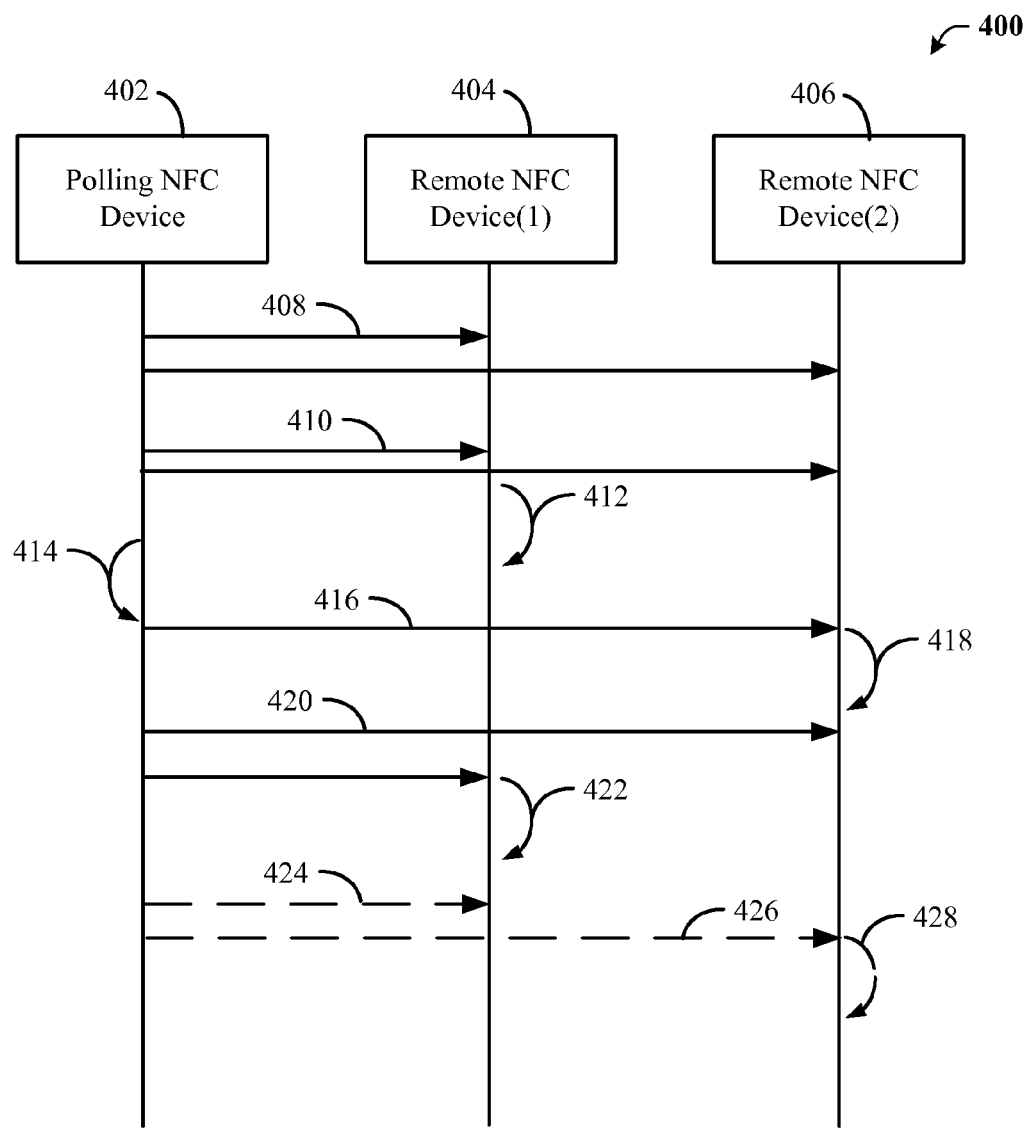
FIG. 4 is a call flow diagram describing an example of an improved device activation procedure is performed, according to an aspect.
Figure 5:
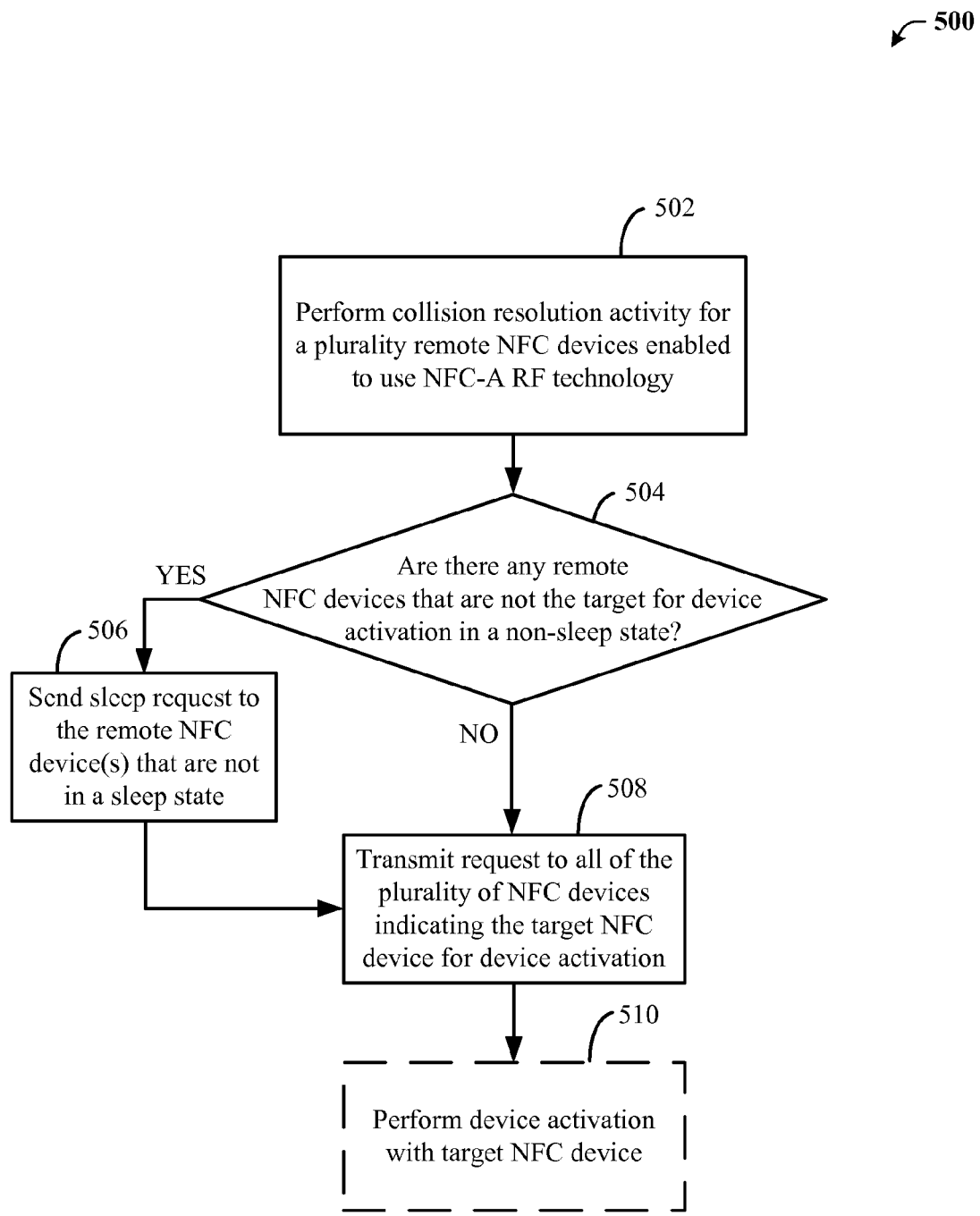
FIG. 5 is a flowchart describing an example of an improved device activation procedure is performed, according to an aspect.

FIGS. 4-5 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4 depicts a call flow diagram conceptually illustrating a communications environment 400 including a polling device 402, and a plurality of remote NFC devices (404, 406), according to an aspect. Communications environment 400 may provide for NFC communications using NFC type-A RF technology.

At act 408, polling NFC device 402 may detect that a plurality of remote NFC devices (404, 406) is within a coverage range of the polling NFC device 402. In an aspect, polling NFC device 402 may perform technology detection activity to detect the plurality of remote NFC devices (404, 406) that are configured to use NFC type-A RF technology.

At act 410, polling NFC device 402 may perform collision resolution to identify each of the remote NFC devices. At act 412, the target NFC device 404 transmits a response message to the initiator NFC device 402. Further, as each remote NFC device is identified, polling NFC device 402 may transmit a transition to sleep message to the identified remote NFC device (e.g., remote NFC device(1) 404) which prompts the remote NFC device to enter a sleep sub-state.

At act 412, remote NFC device(1) 404 may switch a sub-state from active to asleep once it has been successfully identified by polling NFC device 402. In an aspect, the last remote NFC device (e.g., remote NFC device (2) 406) that is resolved may remain with an active sub-state status.

At act 414, the polling NFC device 402 may determine that the remote NFC device 406 that was left with an active sub-state status is not the remote NFC device with which the polling NFC device intents to communicate. In an aspect, the polling NFC device 402 may further determine that the remote NFC device 406 that was left with an active sub-state status is a remote NFC device 406 that the polling NFC device 402 may communicate with in the future.

At act 416, polling NFC device 402 may transmit a sleep request to remote NFC device (2) 406.

At act 418, remote NFC device (2) 406 may change a sub-state status from active to asleep (SLEEP).

At act 420, as part of device activation, polling NFC device 402 may transmit a request to all of the plurality of remote NFC devices (404, 406). In operation, when a remote NFC device (404, 406) with an active sub-state receives a request (ALL_REQ), it changes from active to idle. By contrast, when a remote NFC device (404, 406) with a sleep sub-state receives a request (ALL_REQ) it changes from sleep to Active. Further, as part of device activation, one remote NFC device 404 of the plurality of remote NFC devices is selected for data exchange and the other remote NFC devices are returned to a sleep sub-state.

At act 422, remote NFC device(1) 404 switches to an active sub-state to perform data exchange with polling NFC device 402.

In an optional aspect, once data exchange has concluded with remote NFC device(1) 404, at act 424, polling NFC device 402 may transmit a sleep request to remote NFC device(1) 404. In operation, once the sleep request is processed by remote NFC device(1) 404, all remote NFC devices are returned to a sleep sub-state.

Continuing the optional aspect, at act 426, polling NFC device 402 may transmit a selection request message to remote NFC device(2) 406. Because remote NFC device(2)

406 was previously placed in a sleep sub-state, at act 416, the selection request may be received and processed. By contrast, had the sleep request not been transmitted at act 416, remote NFC device(2) 406 would be in an idle sub-state and unable to receive the selection request. At act 428, remote NFC device(2) 406 may switch from the sleep sub-state to an active sub-state and data exchange between the polling NFC device 402 and remote NFC device(2) 406 may be performed.

FIG. 5 depicts a flowchart describing an example process 500 for improved device activation in which a plurality of remote NFC devices are within a coverage range of a polling NFC device.

At block 502, a polling NFC device may perform a collision resolution activity for a plurality remote NFC devices. In an aspect, each of the remote NFC device in the plurality of remote NFC devices is enabled to use NFC-A RF technology. In an aspect, as part of the collision resolution activity the last remote NFC device of the plurality of resolved remote NFC device may be left in an active sub-state and all other NFC devices of the plurality of resolution other than the last remote NFC device may be left in a sleep sub-state.

At block 504, the polling NFC device may determine whether there are any remote NFC devices that are not the target for device activation and that are currently not in a sleep sub-state (e.g., SLEEP_A Sub-state). In an aspect, the polling NFC device may further determine whether any device that is not currently in a sleep sub-state may be intended as a future target for communications. In such an aspect, the polling NFC may determine if, for any value of N other than an initiation index (INT_INDEX), an initiation NFC identifier sleep index (INT_NFCIDX_SLEEP[N]) is equal to 0b (e.g., at least one other device is not in SLEEP_A Sub-state), then the polling NFC device proceed to block 506.

Upon a determination that there is a remote NFC device that is not target NFC device but is still in an active sub-state, at block 506, the polling NFC device may transmit a sleep request to the determined remote NFC device. In an aspect, the NFC polling device may send a sleep request (SLP_REQ) command to ensure that all devices are in the SLEEP_A Sub-state.

Further, upon a determine that there are currently no remote NFC devices that are in an active sub-state, and/or after the sleep request has been processed by the determined remote NFC device, at block 508, the polling NFC device may transmit a request to all remote NFC devices of the plurality of remote NFC devices indicating which remote NFC device is selected for device activation.

In an optional aspect, the polling NFC device may then perform device activation and exchange data with the selected remote NFC device.

Figure 6:
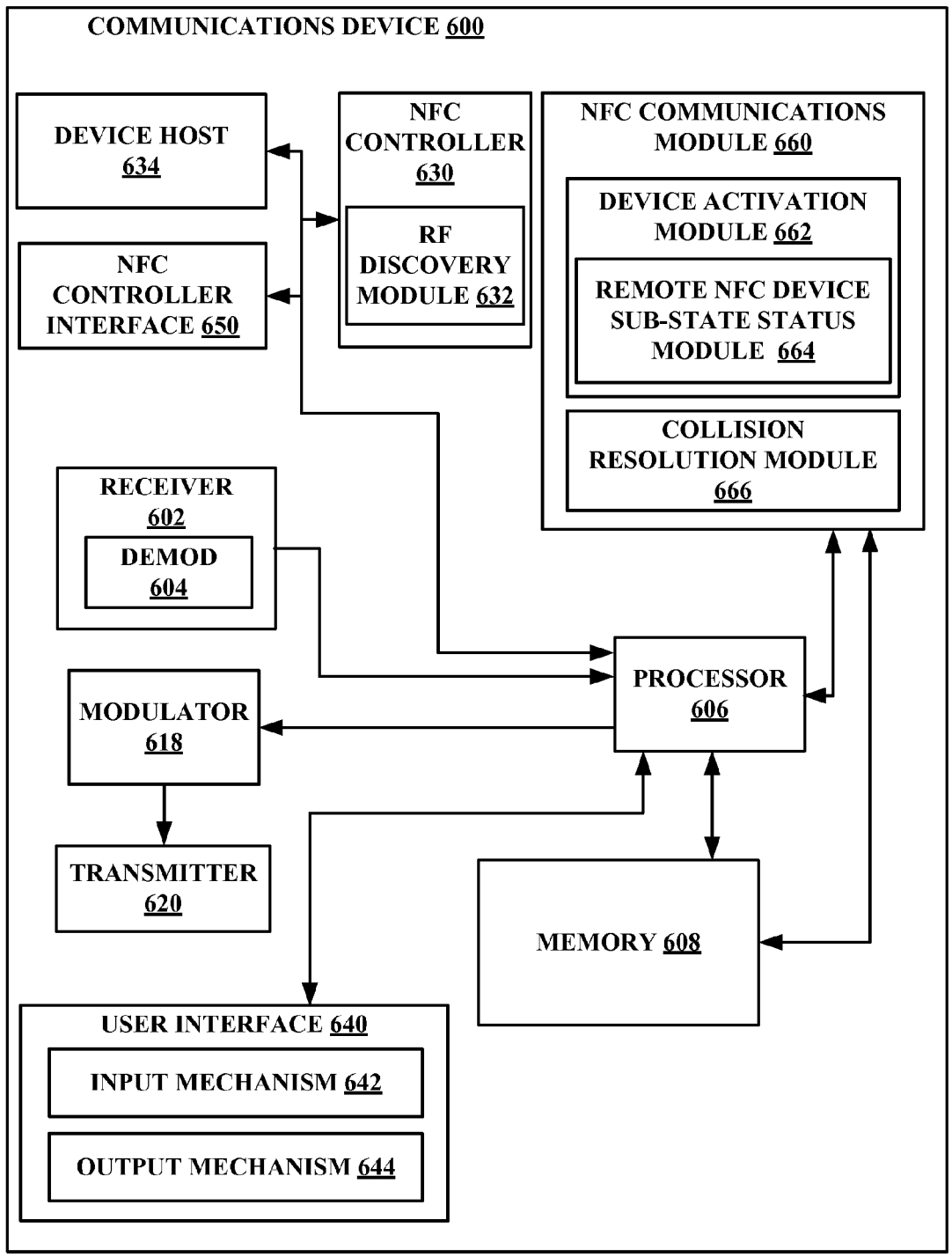
FIG. 6 is a functional block diagram of an example architecture of a communications device, according to an aspect.

While referencing FIG. 3, but turning also now to FIG. 6, an example architecture of communications device 600 is illustrated. As depicted in FIG. 6, communications device 600 comprises receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of communications device 600, and/or a processor that both analyzes information received by receiver 602, generates information for transmission by transmitter 620, and controls one or more components of communications device 600. Further, signals may be prepared for transmission by transmitter 620 through modulator 618 which may modulate the signals processed by processor 606.

Communications device 600 can additionally comprise memory 608 that is operatively coupled to various components, such as but not limited processor 606 and that can store data to be transmitted, received data, information related to available channels, TCP flows, data associated with analyzed signal and/or interference strength, information related to an assigned channel, power, rate, or the like, and any other suitable information for assisting in NFC connection establishment.

Further, processor 606, device host 634, NFCC 630, and/or NFC communications module 660 can provide means for determining that a remote NFC device of a plurality of resolved remote NFC devices, other than a last remote NFC device of the plurality of resolved remote NFC devices is a target NFC device for a device activation process, and means for transmitting a first sleep request to the last remote NFC device of the plurality of resolved remote NFC devices.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory.

Communications device 600 may include a NFC controller 630. In an aspect, NFCC 630 may include RF discovery module 632. RF discovery module 632 may be configured to perform RF discovery using a RF discovery loop (e.g., 610) as part of a discovery process to enable NFC communications. DH 634 may be configured to generate a command to prompt NFCC 630 to perform various NFC actions, such as but not limited to, RF discovery, etc.

In another aspect, communications device 600 may include NCI 650. In an aspect, NCI 650 may be configured to enable communications between a NFC controller 630 and DH 634. NCI 650 may be configured to function in a listening mode and/or a polling mode. During passive communication mode communications, whichever mode the communications device 600 begins NFC communications as is the mode that the communications device 600 may remain for the duration of the NFC communications. During active communication mode communications, communications device 600 may switch listening mode and polling mode responsibilities during a NFC communications link.

In another aspect, communications device 600 may include NFC communications module 660. NFC communications module 660 may be configured to enable various modes and/or configurations for NFC communications. In an aspect, NFC communications module 660 may include device activation module 662 that may be configured to configure data exchange between a selected remote NFC device and the communications device 600. In another aspect, NFC communications module 660 may include collision resolution module 666 that may be configured to perform a collision resolution process to resolve one or more remote NFC devices that are within range to be able to communicate with communications device 600. Device activation module 662 may include remote NFC device sub-state status module 664 that may be configured to be aware of the current sub-state status of each of the remote NFC devices. In an aspect, upon the successful conclusion of the collision resolution process, remote NFC device sub-state status module 664 that may be aware that all of the remote NFC device, with the exception of the last remote NFC device that was resolved, are in a sleep sub-state status. Further, remote NFC device sub-state status module 664 that may be aware that the last remote NFC device that was resolved has an active sub-state status. Still further, wherein NFC communications module 660 determines that communications device 600 intends to communication with any of the plurality of remote NFC devices besides the last resolved remote NFC device, device activation module 662 may prompt the communications device 600 to transmit a sleep request (SLP_REQ) to the last resolved remote NFC device. In another aspect, NFC communications module 660 may further determine whether the communications device 600 may intend to communicate with the last resolved remote NFC device prior to prompting the communications device 600 to transmit the sleep request. In other words, where subsequent communications with the last resolved remote NFC device are not expected, no additional signaling may be performed.

In another aspect, NFC communications module 660 may be configured to perform any of the one or more processes described with respect to FIGS. 4-5.

Additionally, communications device 600 may include user interface 640. User interface 640 may include input mechanisms 642 for generating inputs into communications device 600, and output mechanism 644 for generating information for consumption by the user of the communications device 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver etc. In the illustrated aspects, the output mechanism 644 may include a display configured to present media content that is in image or video format or an audio speaker to present media content that is in an audio format.

Figure 7:
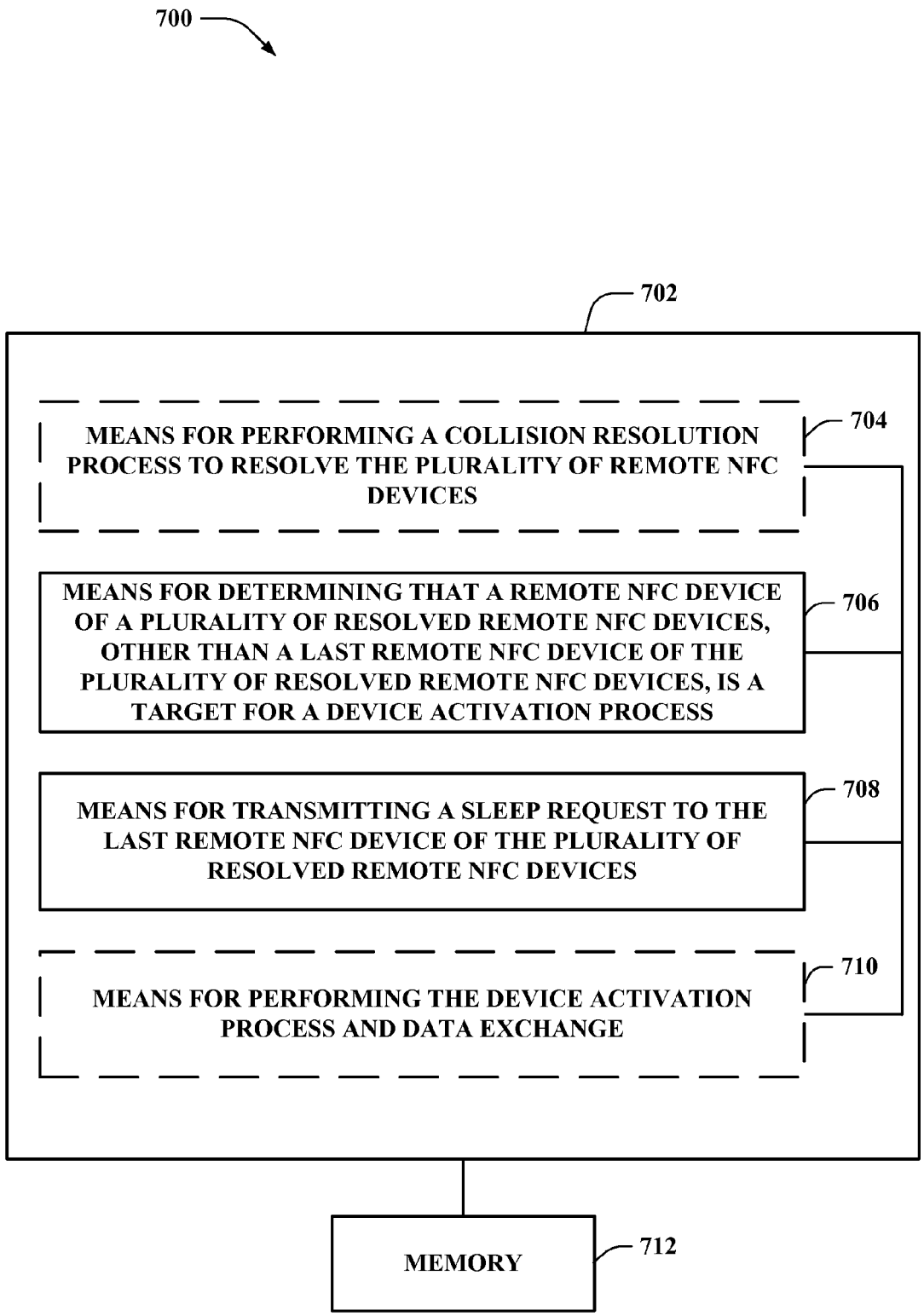
FIG. 7 is a functional block diagram of an example communication system for improving device activation procedures, according to an aspect.

FIG. 7 depicts another block diagram of an exemplary communication system 700 configured to improve device activation among a plurality of NFC type-A RF technology listening devices, according to an aspect. For example, system 700 can reside at least partially within a communications device (e.g., communications device 600). It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction.

For instance, in an optional aspect, logical grouping 702 can include an electrical component that may provide means for performing a collision resolution process to resolve a plurality of remote NFC devices 704. For example, in an aspect, the means for performing the collision resolution 704 can include DH 634, NFCC 630, NFC communications module 660, and/or processor 606 of communications device 600. In an aspect, the means for performing the collision resolution 704 may be configured to keep the last remote NFC device of the plurality of resolved remote NFC device being left in an active sub-state, and place all other NFC devices of the plurality of resolved remote NFC devices in a sleep sub-state.

Further, logical grouping 702 can include an electrical component that may provide means for determining that a remote NFC device of a plurality of resolved remote NFC devices, other than a last remote NFC device of the plurality of resolved remote NFC devices, is a target NFC device for a device activation process 706. For example, in an aspect, the means for determining 706 can include DH 634, NFCC 630, NFC communications module 660, and/or processor 606 of communications device 600. In an aspect, the remote NFC devices may be enabled using a NFC type-A RF technology.

Moreover, logical grouping 702 can include an electrical component that may provide means for transmitting sleep request messages to identified remote NFC devices and/or device sensing request messages 708. For example, in an aspect, the means for transmitting 708 can include transmitter 620, DH 634, NFCC 630, NFC communications module 660, and/or processor 606 of communications device 600. In an aspect, the sleep request message may be a SLP_REQ message. In an aspect, the means for transmitting 708 may be configured to transmit a sleep request message to an identified first remote NFC device. In an aspect, the means for transmitting 708 may be configured to transmit a selection request to the target NFC device of the plurality of resolved remote NFC devices. In an aspect, the request may be an ALL_REQ message, and the selection request may be one or more SEL_REQ messages. In an aspect, the means for transmitting 708 may be configured to transmit a sleep request to the target NFC device of the plurality of resolved remote NFC devices.

In another optional aspect, logical grouping 702 can include an electrical component that may provide means for performing the device activation process and data exchange 710. For example, in an aspect, the means for performing the device activation process and data exchange 710 can include DH 634, NFCC 630, NFC communications module 660, and/or processor 606 of communications device 600. In an aspect, the means for performing the device activation process and data exchange 710 may be configured to perform the device activation process and data exchange with the target NFC device. In an aspect, the means for performing the device activation process and data exchange 710 may be configured to perform the device activation process and data exchange with the last remote NFC device once a sleep request has been transmitted to the target NFC device of the plurality of resolved remote NFC devices.

Additionally, system 700 can include a memory 712 that retains instructions for executing functions associated with the electrical components 704, 706, 708, and 710, stores data used or obtained by the electrical components 704, 706, 708, 710, etc. While shown as being external to memory 712, it is to be understood that one or more of the electrical components 704, 706, 708, and 710 may exist within memory 712. In one example, electrical components 704, 706, 708, and 710 can include at least one processor, or each electrical component 704, 706, 708, and 710 can be a corresponding module of at least one processor. Moreover, in an additional or alternative example, electrical components 704, 706, 708, and 710 may be a computer program product including a computer readable medium, where each electrical component 704, 706, 708, and 710 may be corresponding code. In an aspect, for example, memory 712 may be the same as or similar to memory 608 (FIG. 6). In another aspect, memory 712 may be associated with DH 634, NFCC 630, and/or NFC communications module 660.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC-F, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
   determining, by a polling near field communication (NFC) device, that a remote NFC device of a plurality of resolved remote NFC devices, other than a last remote NFC device of the plurality of resolved remote NFC devices, is a target NFC device for a device activation process; and
   transmitting a first sleep request to the last remote NFC device of the plurality of resolved remote NFC devices.

2. The method of claim 1, further comprising:
   performing a collision resolution process to resolve a plurality of remote NFC devices.

3. The method of claim 2, wherein performing the collision resolution process comprises:
   keeping the last remote NFC device of the plurality of resolved remote NFC devices in an active sub-state; and
   placing all other NFC devices of the plurality of resolved remote NFC devices in a sleep sub-state.

4. The method of claim 1, further comprising:
   performing the device activation process and data exchange with the target NFC device;
   transmitting a second sleep request to the target NFC device of the plurality of resolved remote NFC devices; and
   performing the device activation process and data exchange with the last remote NFC device.

5. The method of claim 1, wherein the plurality of resolved remote NFC devices are enabled using a NFC type-A radio frequency (RF) technology.

6. The method of claim 1, wherein the first sleep request is a SLP_REQ message.

7. The method of claim 1, wherein the device activation process comprises:
   transmitting a request to all of the plurality of resolved remote NFC devices; and
   transmitting a selection request to the target NFC device of the plurality of resolved remote NFC devices.

8. The method of claim 7, wherein the request is an ALL_REQ message, and the selection request is one or more SEL_REQ messages.

9. A computer program product, comprising:
   a non-transitory computer-readable medium comprising code for:
   determining, by a polling near field communication (NFC) device, that a remote NFC device of a plurality of resolved remote NFC devices, other than a last remote NFC device of the plurality of resolved remote NFC devices, is a target NFC device for a device activation process; and
   transmitting a first sleep request to the last remote NFC device of the plurality of resolved remote NFC devices.

10. The computer program product of claim 9, wherein the non-transitory computer-readable medium further comprises code for performing a collision resolution process to resolve a plurality of remote NFC devices.

11. The computer program product of claim 10, wherein the non-transitory computer-readable medium further comprises code for:
    keeping the last remote NFC device of the plurality of resolved remote NFC devices in an active sub-state; and
    placing all other NFC devices of the plurality of resolved remote NFC devices in a sleep sub-state.

12. The computer program product of claim 9, wherein the non-transitory computer-readable medium further comprises code for:
    performing the device activation process and data exchange with the target NFC device;
    transmitting a second sleep request to the target NFC device of the plurality of resolved remote NFC devices; and
    performing the device activation process and data exchange with the last remote NFC device.

13. The computer program product of claim 9, wherein the plurality of resolved remote NFC devices are enabled using a NFC type-A radio frequency (RF) technology.

14. The computer program product of claim 9, wherein the first sleep request is a SLP_REQ message.

15. The computer program product of claim 9, wherein the non-transitory computer-readable medium further comprises code for:
    transmitting a request to all of the plurality of resolved remote NFC devices; and
    transmitting a selection request to the target NFC device of the plurality of resolved remote NFC devices.

16. The computer program product of claim 15, wherein the request is an ALL_REQ message and the selection request is one or more SEL_REQ messages.

17. An apparatus for wireless communications, comprising:
    means for determining, by a polling near field communication (NFC) device, that a remote NFC device of a plurality of resolved remote NFC devices, other than a last remote NFC device of the plurality of resolved remote NFC devices, is a target NFC device for a device activation process; and
    means for transmitting a first sleep request to the last remote NFC device of the plurality of resolved remote NFC devices.

18. The apparatus of claim 17, further comprising means for performing a collision resolution process to resolve a plurality of remote NFC devices.

19. The apparatus of claim 18, wherein the means for performing the collision resolution process are further configured to:
  keep the last remote NFC device of the plurality of resolved remote NFC devices in an active sub-state; and
  place all other NFC devices of the plurality of resolved remote NFC devices in a sleep sub-state.

20. The apparatus of claim 17, further comprising:
  means for performing the device activation process and data exchange with the target NFC device;
  wherein the means for transmitting is further configured to transmit a second sleep request to the target NFC device of the plurality of resolved remote NFC devices; and
  wherein the means for performing the device activation process and data exchange are further configured to perform the device activation process and data exchange with the last remote NFC device.

21. The apparatus of claim 17, wherein the plurality of resolved remote NFC devices are enabled using a NFC type-A radio frequency (RF) technology.

22. The apparatus of claim 17, wherein the first sleep request is a SLP_REQ message.

23. The apparatus of claim 17, wherein the means for transmitting is further configured to:
  transmit a request to all of the plurality of resolved remote NFC devices; and
  transmit a selection request to the target NFC device of the plurality of resolved remote NFC devices.

24. The apparatus of claim 23, wherein the request is an ALL_REQ message, and the selection request is one or more SEL_REQ messages.

25. An apparatus for NFC communications, comprising:
  a transceiver;
  a memory;
  a processor coupled to the memory; and
  a NFC communications module coupled to at least one of the memory or the processor and configured to determine that a remote NFC device of a plurality of resolved remote NFC devices, other than a last remote NFC device of the plurality of resolved remote NFC devices, is a target NFC device for a device activation process; and
  wherein the transceiver is configured to transmit a first sleep request to the last remote NFC device of the plurality of resolved remote NFC devices.

26. The apparatus of claim 25, wherein the NFC communications module is further configured to perform a collision resolution process to resolve a plurality of remote NFC devices.

27. The apparatus of claim 26, wherein the NFC communications module is further configured to:
  keep the last remote NFC device of the plurality of resolved remote NFC devices in an active sub-state; and
  place all other NFC devices of the plurality of resolved remote NFC devices in a sleep sub-state.

28. The apparatus of claim 25, wherein the NFC communications module is further configured to:
  perform the device activation process and data exchange with the target NFC device;
  wherein the transceiver is further configured to transmit a second sleep request to the target NFC device of the plurality of resolved remote NFC devices; and
  wherein the NFC communications module is further configured to perform the device activation process and data exchange with the last remote NFC device.

29. The apparatus of claim 25, wherein the plurality of resolved remote NFC devices are enabled using a NFC type-A radio frequency (RF) technology.

30. The apparatus of claim 25, wherein the first sleep request is a SLP_REQ message.

31. The apparatus of claim 25, wherein the transceiver is further configured to:
  transmit a request to all of the plurality of resolved remote NFC devices; and
  transmit a selection request to the target NFC device of the plurality of resolved remote NFC devices.

32. The apparatus of claim 31, wherein the request is an ALL_REQ message, and the selection request is one or more SEL_REQ messages.

* * * * *